US011794802B1

United States Patent
Tinnin et al.

(10) Patent No.: US 11,794,802 B1
(45) Date of Patent: Oct. 24, 2023

(54) STEERING COLUMN ACTUATOR ASSEMBLY TRAVEL STOP

(71) Applicant: Steering Solutions IP Holding Corporation, Saginaw, MI (US)

(72) Inventors: Melvin L. Tinnin, Clio, MI (US); Joen C. Bodtker, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/746,442

(22) Filed: May 17, 2022

(51) Int. Cl.
| | |
|---|---|
| *B62D 1/18* | (2006.01) |
| *B62D 1/181* | (2006.01) |
| *F16H 25/22* | (2006.01) |
| *F16H 25/20* | (2006.01) |
| *B62D 1/187* | (2006.01) |

(52) U.S. Cl.
CPC ............. *B62D 1/181* (2013.01); *B62D 1/187* (2013.01); *F16H 25/2015* (2013.01); *F16H 25/2209* (2013.01)

(58) Field of Classification Search
CPC ...... F16H 25/2015; B62D 1/181; B62D 1/185
USPC .......................................... 74/89.37
See application file for complete search history.

(56) References Cited

U.S. PATENT DOCUMENTS

| | | | | |
|---|---|---|---|---|
| 2,430,458 A | * | 11/1947 | Farrell | B25B 5/101 269/189 |
| 4,834,355 A | * | 5/1989 | Fan | B25B 1/125 269/181 |
| 10,239,552 B2 | | 3/2019 | Bodtker | |
| 10,676,126 B2 | | 6/2020 | Bodtker | |

* cited by examiner

*Primary Examiner* — Randell J Krug
(74) *Attorney, Agent, or Firm* — Dickinson Wright PLLC

(57) ABSTRACT

An adjustment actuator assembly for a vehicle steering system includes a leadscrew having a threaded outer surface and at least one pocket recessed radially inwardly from an outer diameter of the threaded outer surface. The adjustment actuator assembly also includes a nut having a threaded inner surface engaged with the threaded outer surface of the leadscrew, the nut axially moveable along the leadscrew during rotation of the leadscrew. The adjustment actuator assembly further includes a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut.

17 Claims, 8 Drawing Sheets

STEERING COLUMN ACTUATOR ASSEMBLY TRAVEL STOP

FIELD OF THE INVENTION

The embodiments described herein relate to vehicle steering systems and, more particularly, to an actuator assembly travel stop for such vehicle steering systems.

BACKGROUND

A steering column assembly of a vehicle may be adjustable in a rake (tilt) direction and/or in a telescoping direction. Each of these adjustments may be carried out with respective power assemblies or mechanisms which may include a nut-leadscrew arrangement.

Power adjustable steering columns are required to have travel limiters built into the actuators to prevent over-travel in the extending and retracting directions of the steering column. Typical systems place spacers along the leadscrew to limit how far the adjustment component(s) (e.g., nut) can travel. However, when the mechanical travel limit is reached, the inertia of the actuator assembly and the steering column may create an impact loading on the threads of the lead screw at a force great enough to potentially cause the seating torque of the actuator component(s) to exceed the stall torque of the actuator. Under such a condition, the actuator components may not be able to unseat from the travel limit position, thus preventing further adjustment of the steering column.

Typical travel limit designs which include spacers and retainers at each end of the leadscrew add to component and overall assembly cost. Additionally, such components require additional error proofing or assembly verification to prevent loose fitting parts which may create noise.

SUMMARY

According to one aspect of the disclosure, an adjustment actuator assembly for a vehicle steering system includes a leadscrew having a threaded outer surface and at least one pocket recessed radially inwardly from an outer diameter of the threaded outer surface. The adjustment actuator assembly also includes a nut having a threaded inner surface engaged with the threaded outer surface of the leadscrew, the nut axially moveable along the leadscrew during rotation of the leadscrew. The adjustment actuator assembly further includes a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut.

According to another aspect of the disclosure, an adjustment actuator assembly for a vehicle steering system includes a leadscrew having a threaded outer surface and a pocket recessed radially inwardly from an outer diameter of the threaded outer surface. The adjustment actuator assembly also includes a nut having a threaded inner surface engaged with the threaded outer surface of the leadscrew, the nut axially moveable along the leadscrew during rotation of the leadscrew. The adjustment actuator assembly further includes a travel stop limiter extending through an opening of the nut and spring biased into contact with the threaded outer surface of the leadscrew and moveable into the pocket of the leadscrew to limit axial translation of the nut upon circumferential contact of the travel stop limiter with a shoulder of the pocket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are embodiments of a travel stop limiter for an adjustment actuator assembly. As discussed herein, the travel stop limiter limits translation of a nut relative to a leadscrew, while avoiding an axial loading of the nut and leadscrew. In contrast to prior assemblies that mechanically stop axial travel of a nut, the embodiments disclosed herein stop rotation of the screw with respect to the nut.

Figure 1:
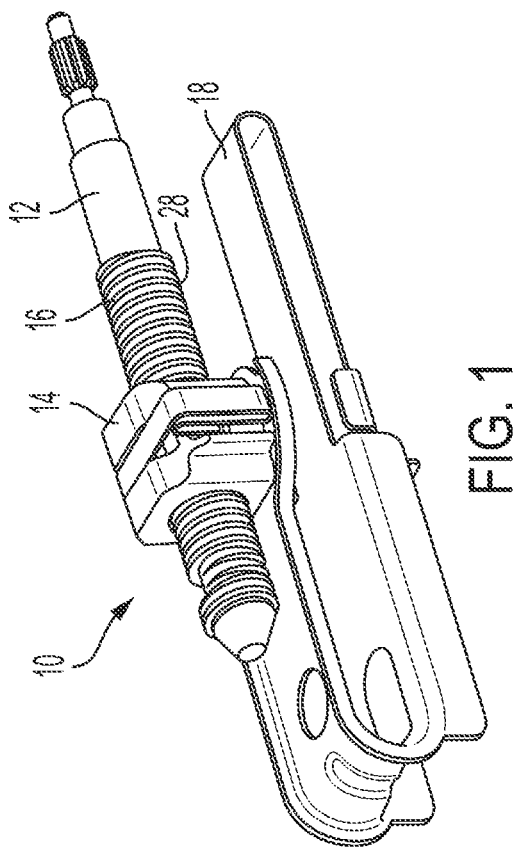
FIG. 1 is a perspective view of a portion of a steering column actuator assembly with a travel stop limiter assembled thereto.
Figure 2:
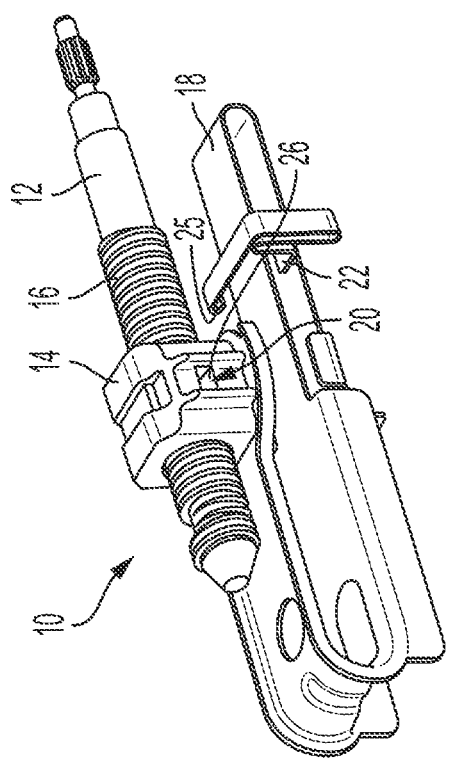
FIG. 2 is a perspective view of the portion of the steering actuator assembly with the travel stop limiter shown prior to assembly.

FIGS. 1 and 2 illustrate a portion of an adjustment actuator assembly for a vehicle steering system. The adjustment actuator assembly is generally referenced with numeral 10. The adjustment actuator assembly 10 includes a portion thereof which is adjustable in an axial direction substantially parallel with a longitudinal axis of the steering column. Axial adjustment refers to any type of movement in the direction substantially parallel to the longitudinal axis, such as translation or telescoping movement of one or multiple structures of the steering column assembly (e.g., jackets). The steering column assembly may be adjustable in a rake direction in some embodiments. Rake adjustment refers to general upward or downward movement of one or multiple structures of the steering column assembly. This movement is not parallel to the longitudinal axis of the steering column and is substantially perpendicular thereto, or at least angled relative to the longitudinal axis. These steering column structures are not shown to more clearly illustrate the portion of the adjustment actuator assembly 10 that is relevant to the embodiments disclosed herein.

The adjustment actuator assembly 10 is provided to facilitate powered axial and/or rake adjustments of the structure(s) of the steering column. The adjustment actuator assembly 10 includes a leadscrew 12 having a nut 14 threaded thereto. In particular, the leadscrew 12 includes a threaded outer surface 16 along an axial portion thereof. The nut 14 includes a threaded inner surface that engages the threaded outer surface 16 of the leadscrew 11. A motor (not shown) rotatably drives the leadscrew 12 to translate the nut 14 therealong. The nut 14 is operatively coupled to one or more column structures 18 to cause axial movement (e.g., translate, telescope, etc.) or rake movement of at least a portion of the steering column during movement of the nut 14 along the leadscrew 12.

Other than the main passage defined by the nut 14, which accommodates the leadscrew 12, the nut 14 defines an opening 20. Although the opening 20 is shown on a side of the nut 14, it is to be appreciated that it is contemplated that the opening 20 may be positioned in alternative locations of the nut 14. The opening 20 is sized to receive a leg 22 of a travel stop limiter 24 therethrough. The opening 20 may include at least one tapered insertion wall 26 that is angled or curved to assist with insertion of the leg 22 during the assembly process. FIG. 1 shows the travel stop limiter 24 assembled to the nut 14 and FIG. 2 shows the travel stop limiter 24 prior to assembly thereto. The travel stop limiter 24 is secured to the nut 14 in any suitable manner based on corresponding geometry and features of the nut 14 and travel stop limiter 24. As shown in the illustrated, non-limiting example, the travel stop limiter 24 includes one or more arms 25 that attach to the nut 14 utilizing the resilient characteristics of the travel stop limiter material. However, other mechanical connections may be employed as well.

The leg 22 extends through the opening 20 sufficiently to be in contact with an outer diameter 28 of the threaded outer surface 16 of the leadscrew 12. In the illustrated embodiment, the travel stop limiter 24 is a single, integrally formed component that is formed of spring steel or a similar material that resiliently biases the leg 22 toward the leadscrew 12 to be in contact with the outer diameter 28 of the leadscrew 12. In other words, the leg 22 of the travel stop limiter 24 extends through the opening 20 and is spring loaded toward the leadscrew 12. The size, shape and contours of the travel stop limiter 24 are not limited to the embodiments illustrated and disclosed herein, as the packaging and strength requirements of different overall systems may vary. In the illustrated embodiment, the leg 22 of the travel stop limiter 24 has an end region 30 (FIG. 3) that is substantially planar and has a width that is larger than the pitch of the threaded outer surface 16 of the leadscrew 12. This width ensures that the end region 30 does not protrude between adjacent threads during movement of the nut 14 in the axial direction. Instead, the end region 30 of the leg 22 rides along the outer diameter 28 of multiple threads at any given time during axial movement of the nut 14. In some embodiments, the axial width of the leg 22 is substantially equal to or greater than 1.0 times the thread pitch of the leadscrew 12. In other embodiments, the axial width of the leg 22 is substantially equal to or greater than 2 thread pitches.

Figure 3:
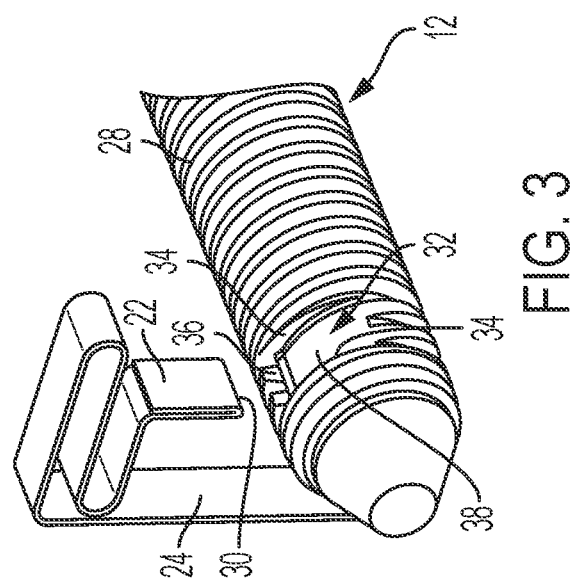
FIG. 3 is a perspective view of the travel stop limiter proximate a travel limiter pocket of a leadscrew.

Referring now to FIG. 3, a pocket 32 of the leadscrew 12 is shown in greater detail. The pocket 32 extends radially inwardly—in a circumferential direction of the leadscrew 12—from the outer diameter 28 of the threaded outer surface 16. The pocket 32 has a width in the axial direction of the leadscrew 12 that is dimensioned to receive the end region 30 when the nut 14 translates to an axial position that positions the end region 30 therein. In some embodiments, the axial width of the pocket 32—as defined by a pair of sidewalls 34—is substantially constant along. As shown, the pocket 32 is defined by the pair of sidewalls 34, a shoulder 36, and a base wall 38. The base wall 38 is effectively a ramp that begins at the outer diameter 28 of the threaded outer surface 16 and gradually recedes radially inwardly in the circumferential direction toward the shoulder 36. In some embodiments, the ramp is helical, as it follows the helix of the thread. The helical shape of the ramp allows the ramp to be only slightly wider than the leg 22 since the helical shape accommodates axial travel of the leg 22 when the leg 22 is within the pocket 32 and prior to contact with the shoulder 36. A pure circumferential ramp (i.e., 0° helix) is contemplated, but the axial width of the pocket 32 is much wider than the leg 22 to allow smooth engagement and disengagement in such embodiments. The position of the ramp 32 on the screw and the aperture 20 in the nut with the thread is timed, such that the aperture 20 will be centered on the peak of the internal thread and the pocket 32 will be centered on the valley of the external thread.

In operation, the leadscrew 12 rotates to axially move the nut 14 therealong. The travel stop limiter 24 is secured to the nut 14 and translates with the nut 14. The leg 22 protrudes through the nut 14 and is biased into contact with the leadscrew 12. Upon reaching an axial position where the end region 30 of the leg 22 aligns with the pocket 32, the end region 30 is spring biased into the pocket 32 due to the spring force of the travel stop limiter 24. In this sense, the travel stop limiter 24 also includes an integrally formed spring component that is simply part of the travel stop limiter itself and which is capable of biasing the leg 22 into contact with the base wall 38 of the pocket 32. Further rotation of the leadscrew 12 results in the end region 30 contacting the shoulder 36 of the pocket 32. This circumferential contact results in a shearing force on the end region 30. This shearing force is lower than the material fracture strength of the leg 22 or the nut 14. Thus, leadscrew 12 rotation is halted when the shoulder 36 of the pocket 32 bottoms out on the leg 22 of the travel stop limiter 24. Because the loading is a shear force due to circumferential contact, no axial loading of the leadscrew 12 and nut 14 occurs. As such, the breakaway torque is equal to the unloaded prevailing torque of the thread assembly. In some embodiments, the base wall 38 is a gradual, non-linear ramp that forms a cam surface for the end region 30 of the leg 22 to traverse.

Figure 2A:
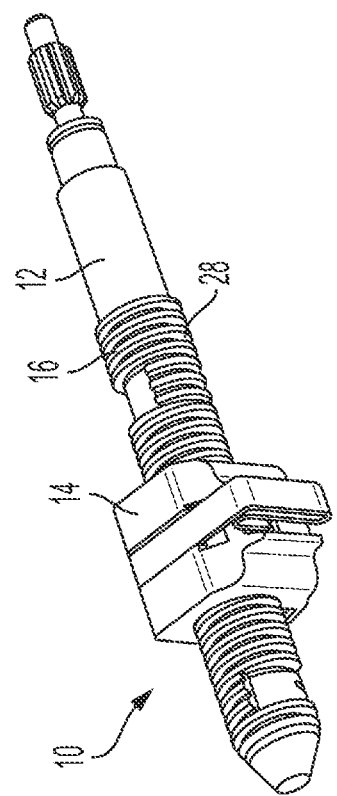
FIG. 2A is a perspective view of the portion of the steering actuator assembly showing a pair of pockets.

In some embodiments, the leadscrew 12 includes two pockets to limit the travel range of the nut 14. In particular, the leadscrew 12 may include a first pocket and a second pocket axially spaced from each other along the leadscrew 12, wherein the first pocket limits axial movement in a first direction and the second pocket limits axial movement in a second direction. The pocket at a distal end of the leadscrew 12—relative to an actuator—stops screw rotation before the leadscrew 12 can exit the nut 14, while the pocket at a proximal end of the leadscrew 12—relative to an actuator—stops screw rotation before the nut 14 can contact an actuator gear housing. FIG. 2A illustrates the leadscrew 12 with two pockets.

Figure 4:
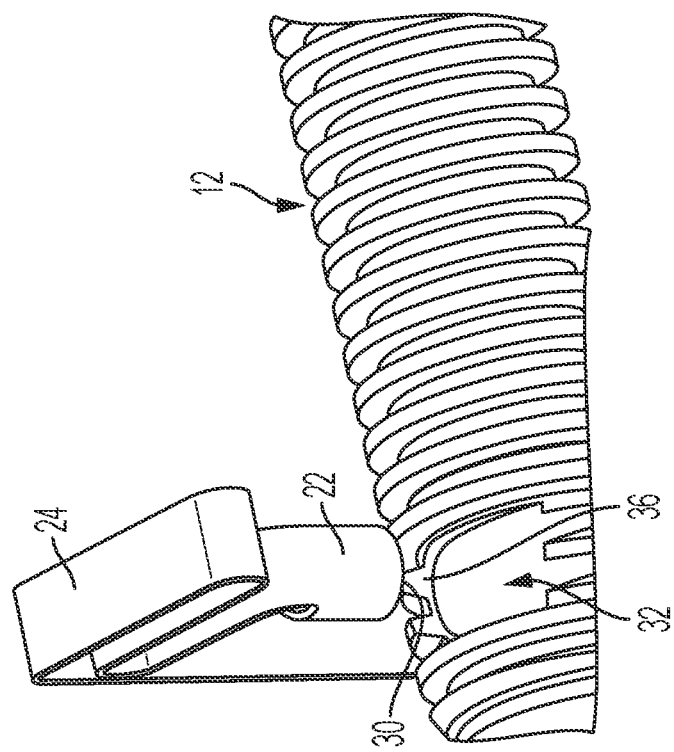
FIG. 4 is a perspective view of the portion of the steering actuator assembly with the travel stop limiter shown prior to assembly according to another embodiment of the disclosure.
Figure 5:
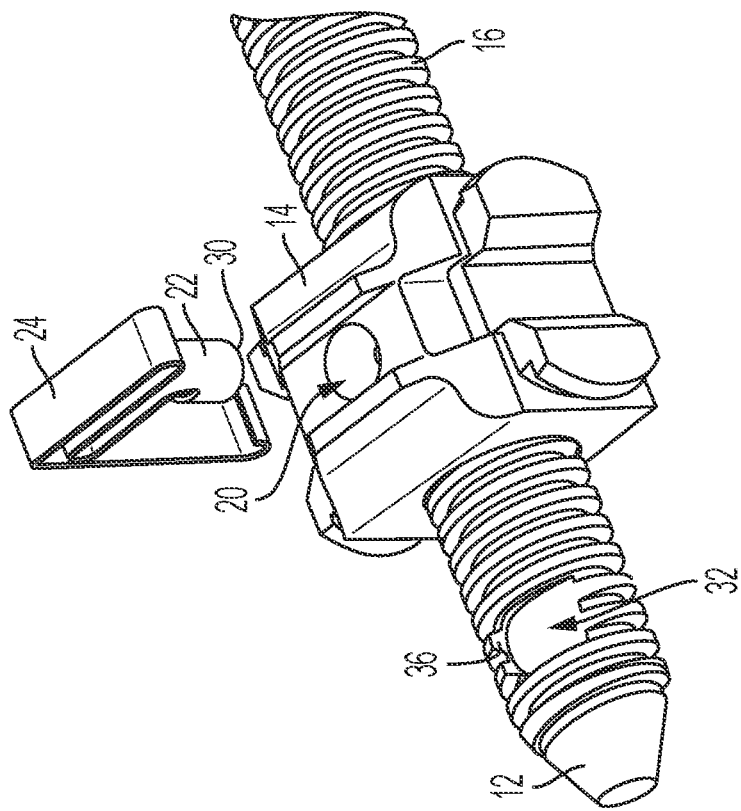
FIG. 5 is a perspective view of the travel stop limiter proximate a travel limiter pocket of a leadscrew according to the embodiment of FIG. 4.

As described above, the end region 30 of the leg 22 is a substantially planar member in the embodiments of FIGS. 1-3. However, referring to FIGS. 4 and 5, the end region 30 of the leg 22 may be formed in other geometric shapes. For example, the leg 22 may be substantially cylindrical, as shown. In such an embodiment, the leg 22 extends through the opening 20, but the opening is shaped to accommodate passage of the cylindrical leg therethrough. Additionally, the shoulder 36 of the pocket(s) 32 has a shape that is tailored to the shape of the end region 30. As shown, the shoulder 36 is rounded to receive the cylindrical end region 30. Although the planar and cylindrical examples are expressly illustrated, it is to be understood that alternative shapes of the end region 30—and possibly the entire leg 22—may be utilized in other embodiments.

Figure 6:
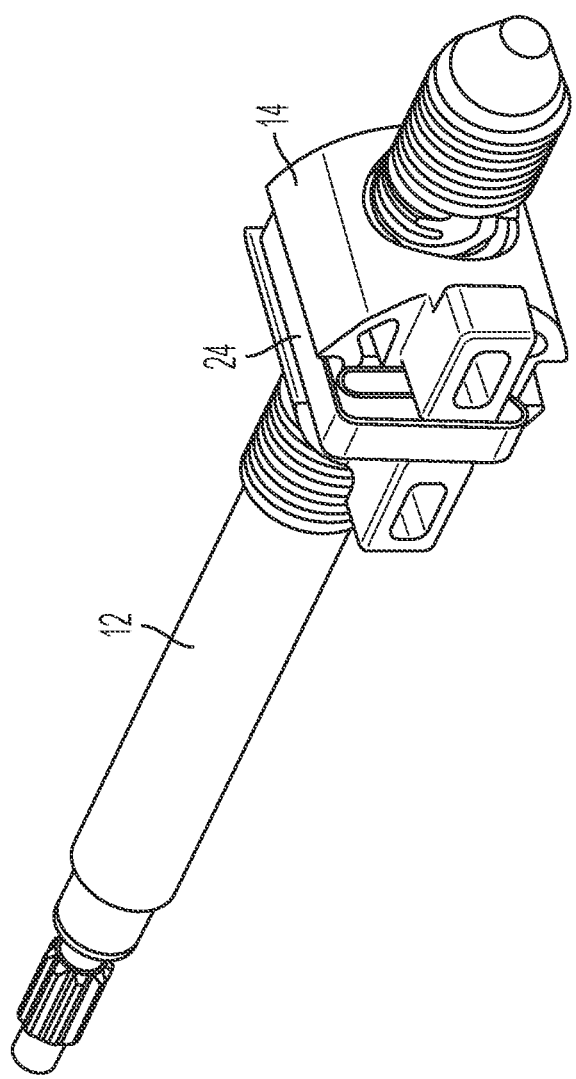
FIG. 6 is a perspective view of the portion of the steering actuator assembly with the travel stop limiter shown prior to assembly according to another embodiment of the disclosure.

The embodiments of FIGS. 1-5 illustrate the nut 14 being a trunnion nut, but other types of nuts are contemplated. For example, the nut 14 may be a jackscrew nut, as shown in FIG. 6. The illustrated examples are non-limiting of the types of nuts that may be employed in the adjustment actuator assembly 10.

Figure 7:
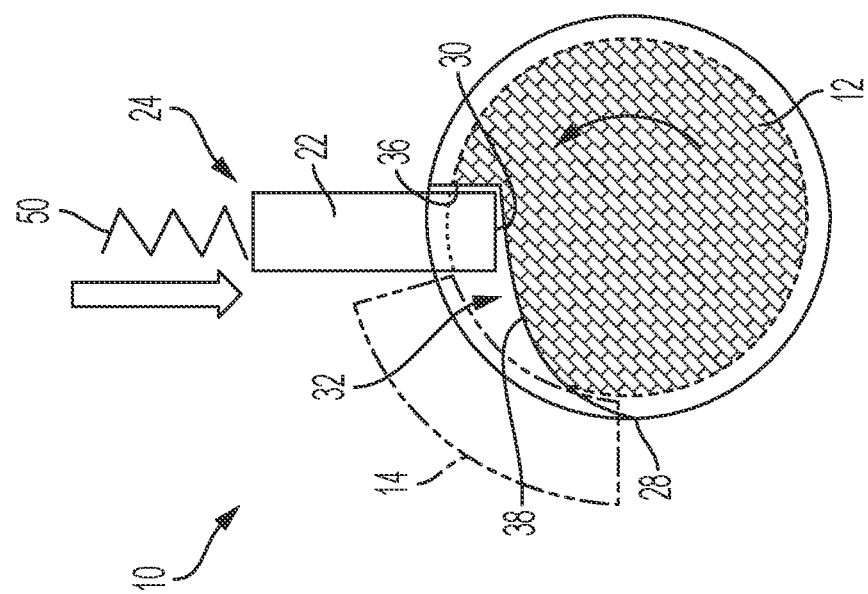
FIG. 7 is a cross-sectional view of the steering column actuator assembly.
Figure 8:
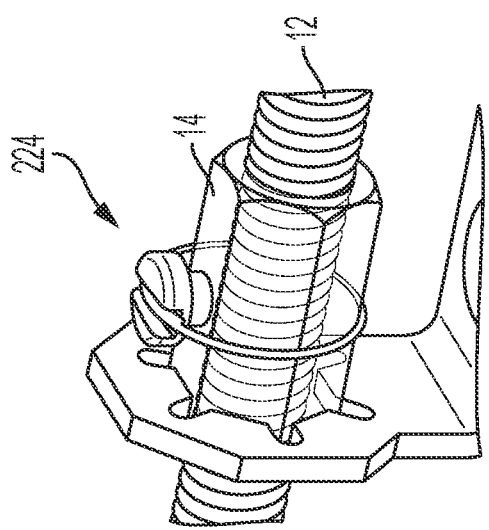
FIG. 8 is a perspective view of the travel stop limiter according to another embodiment of the disclosure.
Figure 9:
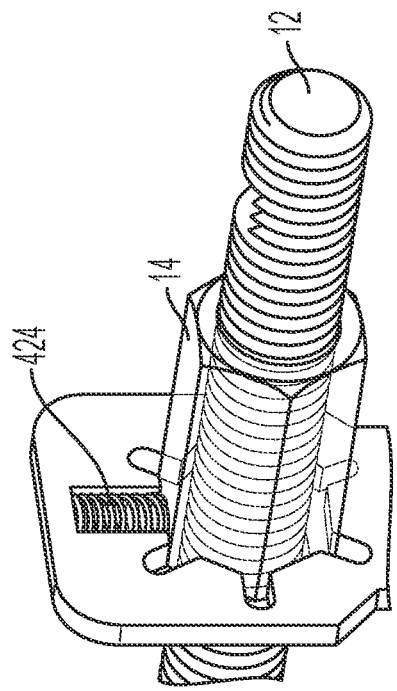
FIG. 9 is a perspective view of the travel stop limiter according to another embodiment of the disclosure.
Figure 10:
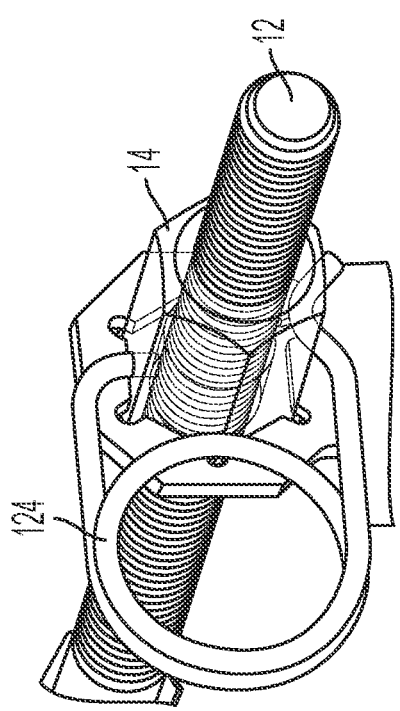
FIG. 10 is a perspective view of the travel stop limiter according to another embodiment of the disclosure.
Figure 11:
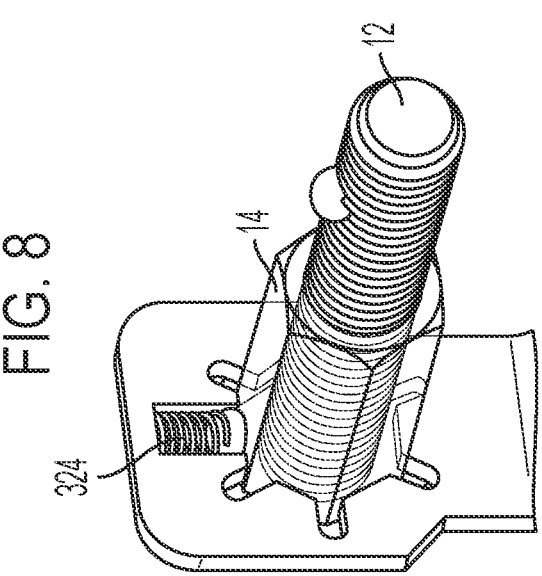
FIG. 11 is a perspective view of the travel stop limiter according to another embodiment of the disclosure.
Figure 12B:
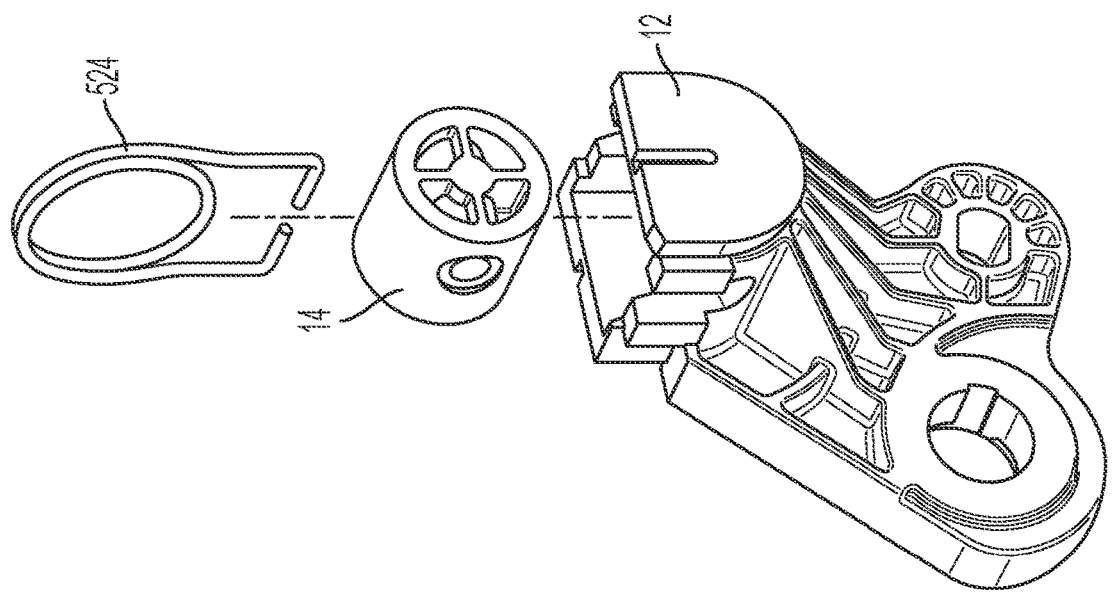
FIG. 12B is a perspective, disassembled view of the travel stop limiter of FIG. 12A.
Figure 12A:
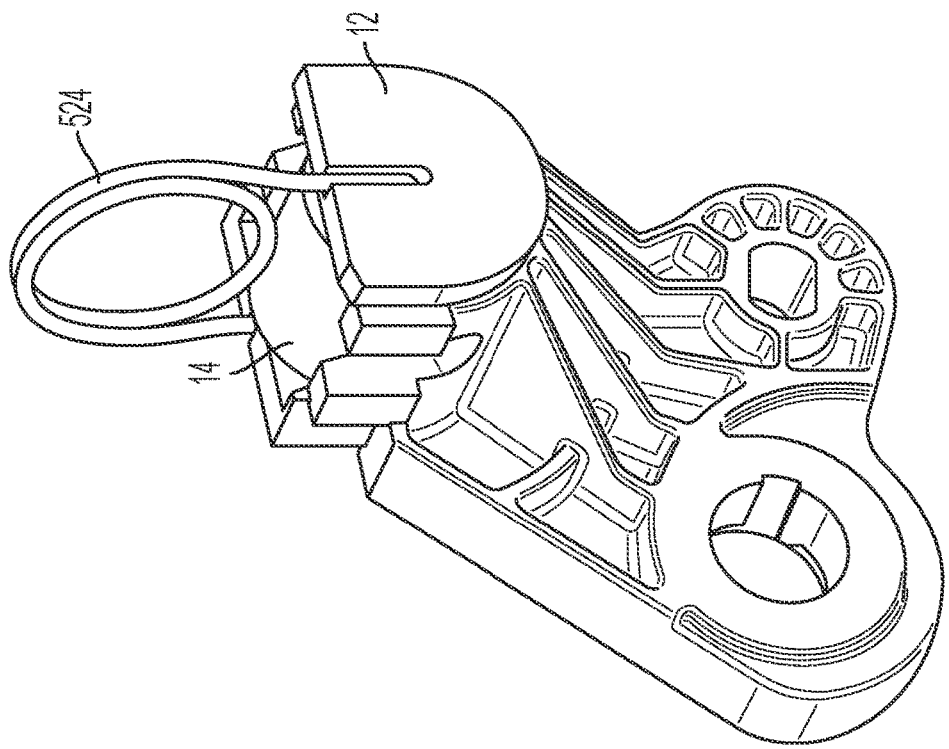
FIG. 12A is a perspective view of the travel stop limiter according to another embodiment of the disclosure.

Referring now to FIG. 7, a portion of the adjustment actuator assembly 10 is illustrated at a generic level of detail. Although the embodiments of FIGS. 1-6 include a single, integrally formed travel stop limiter 24 of a certain type of geometry that includes a spring component biasing the leg 22, it is to be understood that at a fundamental level the adjustment actuator assembly 10 may include any combination of a spring component 50 and leg 22. For example, the spring component 50 may be a separate component from the travel stop limiter 24, and particularly separate from the leg 22.

In the illustration of FIG. 7, a cross-section of the nut 14 and the leadscrew 12 is shown, with the leg 22 and the spring component 50 (which are either integrally formed as a single component or separate components) assembled thereto. As shown, during rotation of the leadscrew 12 in a direction represented with arrow A, the end region 30 of the leg 22 is biased by the spring component 50 into contact with the base wall 38 of the pocket 32 and rides therealong until it contacts the shoulder 36 of the pocket 32. The view in FIG. 7 shows an embodiment with a gradual, non-linear radial inward progression of the base wall 38 from the outer diameter 28 of the leadscrew 12 toward the shoulder 36.

Figure 15:
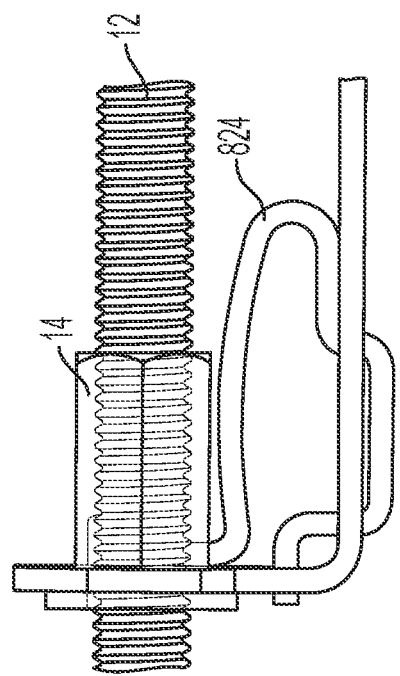
FIG. 15 is a perspective view of the travel stop limiter according to another embodiment of the disclosure.
Figure 13:
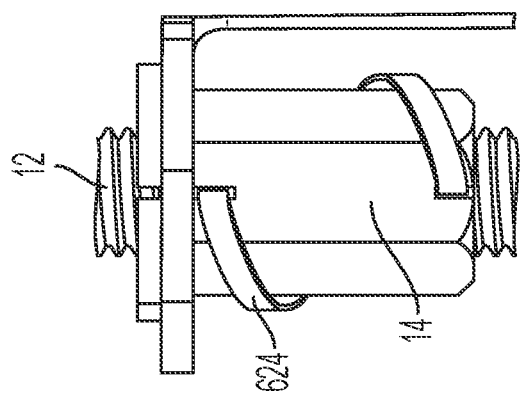
FIG. 13 is a perspective view of the travel stop limiter according to another embodiment of the disclosure.
Figure 14:
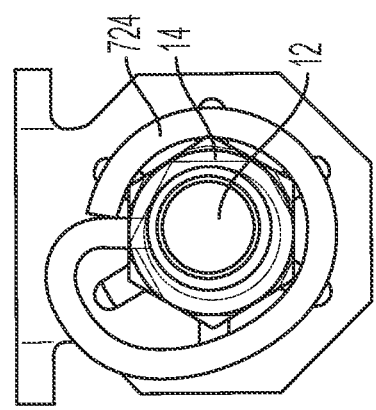
FIG. 14 is a perspective view of the travel stop limiter according to another embodiment of the disclosure.

FIGS. 8-15 illustrate various examples of contemplated travel stop limiters 24, with the spring component 50 either integrally formed therewith or as separate components. For example, the travel stop limiter 24 may be a cotter pin 124 (FIG. 8), a spring retaining and biasing a plunger pin arrangement 224 (FIG. 9), a spring and plunger ball arrangement 324 (FIG. 10), a radial coil spring 424 with an end configured to enter the pocket (FIG. 11), a torsion spring 524 (FIGS. 12A and 12B), a helical flat spring 624 (FIG. 13), a C-ring 724 (FIG. 14), or a cantilever spring 824 (FIG. 15). The preceding list of examples is merely illustrative and should not be understood to be limiting of the types of travel stop limiters that may be utilized.

The embodiments disclosed herein include a travel stop limiter 24 that includes a leg 22 which is spring loaded to adjacent parts to eliminate lash and rattle, is scalable to meet a variety of torque requirements, is compact, and does not require additional parts for assembly or additional tools for assembly. The assembly process is simplified when compared to other designs, as assembly requires a single step consisting of inserting one part (i.e., travel stop limiter 24) into another (i.e., nut 14). As discussed above, the travel stop limiter 24 limits translation of the nut 14 relative to the leadscrew 12, while avoiding an axial loading of the nut 14 and leadscrew 12, which can result in malfunction of the adjustment actuator assembly 10. In contrast to prior assemblies that mechanically stop axial travel of a nut, the embodiments disclosed herein stop rotation of the leadscrew 12 with respect to the nut 14.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment actuator assembly for a vehicle steering system comprising:
   a leadscrew having a threaded outer surface and at least one pocket recessed radially inwardly from an outer diameter of the threaded outer surface;
   a nut having a threaded inner surface engaged with the threaded outer surface of the leadscrew, the nut axially moveable along the leadscrew during rotation of the leadscrew; and
   a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut, wherein the at least one pocket comprises a ramp extending radially inwardly from the outer diameter of the threaded outer surface to a shoulder, wherein an axial width of the pocket is constant and dimensioned to receive the leg of the travel stop limiter therein, the axial width of the pocket greater than a width of the leg.

2. The adjustment actuator assembly of claim 1, wherein the leg of the travel stop limiter is spring biased by a spring component.

3. The adjustment actuator assembly of claim 2, wherein the spring component is integrally formed with the travel stop limiter.

4. The adjustment actuator assembly of claim 2, wherein the spring component is a separate component relative to the travel stop limiter.

5. The adjustment actuator assembly of claim 1, wherein the leg of the travel stop limiter is cylindrical.

6. The adjustment actuator assembly of claim 1, wherein the adjustment actuator assembly is an axial actuator assembly.

7. The adjustment actuator assembly of claim 1, wherein the adjustment actuator assembly is a rake actuator assembly.

8. An adjustment actuator assembly for a vehicle steering system comprising:
- a leadscrew having a threaded outer surface and at least one pocket recessed radially inwardly from an outer diameter of the threaded outer surface;
- a nut having a threaded inner surface engaged with the threaded outer surface of the leadscrew, the nut axially moveable along the leadscrew during rotation of the leadscrew; and
- a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut, wherein the at least one pocket comprises a ramp extending radially inwardly from the outer diameter of the threaded outer surface to a shoulder, wherein the ramp extends radially inwardly non-linearly.

9. The adjustment actuator assembly of claim 8, wherein the leg of the travel stop limiter is spring biased by a spring component.

10. The adjustment actuator assembly of claim 9, wherein the spring component is integrally formed with the travel stop limiter.

11. The adjustment actuator assembly of claim 9, wherein the spring component is a separate component relative to the travel stop limiter.

12. The adjustment actuator assembly of claim 8, wherein the leg of the travel stop limiter is cylindrical.

13. The adjustment actuator assembly of claim 8, wherein the adjustment actuator assembly is an axial actuator assembly.

14. The adjustment actuator assembly of claim 8, wherein the adjustment actuator assembly is a rake actuator assembly.

15. An adjustment actuator assembly for a vehicle steering system comprising:
- a leadscrew having a threaded outer surface and at least one pocket recessed radially inwardly from an outer diameter of the threaded outer surface;
- a nut having a threaded inner surface engaged with the threaded outer surface of the leadscrew, the nut axially moveable along the leadscrew during rotation of the leadscrew; and
- a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut, wherein the opening of the nut is at least partially defined by a plurality of insertion walls, wherein at least one of the insertion walls is tapered.

16. An adjustment actuator assembly for a vehicle steering system comprising:
- a leadscrew having a threaded outer surface and at least one pocket recessed radially inwardly from an outer diameter of the threaded outer surface;
- a nut having a threaded inner surface engaged with the threaded outer surface of the leadscrew, the nut axially moveable along the leadscrew during rotation of the leadscrew; and
- a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut, wherein the at least one pocket comprises a ramp extending radially inwardly from the outer diameter of the threaded outer surface to a shoulder, wherein the ramp extends in a helical direction to accommodate axial travel of the leg during movement within the pocket.

17. An adjustment actuator assembly for a vehicle steering system comprising:
- a leadscrew having a threaded outer surface and at least one pocket recessed radially inwardly from an outer diameter of the threaded outer surface;
- a nut having a threaded inner surface engaged with the threaded outer surface of the leadscrew, the nut axially moveable along the leadscrew during rotation of the leadscrew; and
- a travel stop limiter operatively coupled to the nut, the travel stop limiter having a leg extending through an opening of the nut and spring biased into contact with the threaded outer surface of the leadscrew and moveable into the pocket of the leadscrew to limit axial translation of the nut, wherein an axial width of the leg is at least 1.0 times a thread pitch of the leadscrew.

\* \* \* \* \*